(12) United States Patent
Mondragon et al.

(10) Patent No.: US 7,887,423 B2
(45) Date of Patent: Feb. 15, 2011

(54) UNIVERSAL JOINT

(75) Inventors: Eduardo Mondragon, Saginaw, MI (US); Keith A. Kozlowski, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 544 days.

(21) Appl. No.: 11/958,056

(22) Filed: Dec. 17, 2007

(65) Prior Publication Data

US 2009/0156319 A1   Jun. 18, 2009

(51) Int. Cl.
*F16D 3/24* (2006.01)
(52) U.S. Cl. ..................................................... 464/141
(58) Field of Classification Search .......... 464/141–143
See application file for complete search history.

(56) References Cited

U.S. PATENT DOCUMENTS

| | | | |
|---|---|---|---|
| 1,622,425 A | * | 3/1927 | Dwyer ........................ 464/141 |
| 4,753,626 A | | 6/1988 | Hazebrook et al. |
| 4,832,657 A | | 5/1989 | Hahn |
| 6,685,571 B1 | | 2/2004 | Smith |

FOREIGN PATENT DOCUMENTS

JP         61-153018 A   *   7/1986   .................. 464/141

* cited by examiner

*Primary Examiner*—Greg Binda
(74) *Attorney, Agent, or Firm*—Cantor Colburn LLP

(57) ABSTRACT

A universal joint includes an outer member defining an interior opening and a plurality of grooves within the opening extending along a longitudinal axis. An inner member is disposed within the opening and includes a plurality of pockets opposing the grooves. A drive ball is disposed within each pocket and engages the opposing groove. Each of the pockets and each of the grooves opposing the pockets include a central axis passing through a ball center of the drive balls. The drive balls are supported by the pockets and define a pocket contact angle. The drive balls are also supported by the grooves and define a groove contact angle. The pocket contact angle is less than the groove contact angle to urge the drive balls upward against the grooves.

10 Claims, 5 Drawing Sheets

UNIVERSAL JOINT

BACKGROUND OF THE INVENTION

1. Field of the Invention

The subject invention relates to a universal joint for transmitting torque between a driving shaft and a driven shaft as the driving shaft and the driven shaft articulate relative to each other.

2. Description of the Prior Art

Current development in the field of universal joints is primarily directed toward improving performance of the universal joint by increasing the torque transmitting capability of the universal joint and reducing noise and vibration of the universal joint. The improved performance of the universal joint has resulted in an increased cost to manufacture the universal joint. However, there is still a demand for inexpensive and easily produced universal joints.

U.S. Pat. No. 4,832,657 (the '657 patent) discloses such an inexpensive and easily produced universal joint. The universal joint comprises an outer member. The outer member defines an interior opening and a plurality of grooves extending along a longitudinal axis and disposed within the interior opening. Each of the grooves is parallel to all other of the grooves and the longitudinal axis and includes a straight linear profile along the longitudinal axis. An inner member is disposed within the interior opening and defines a plurality of apertures extending radially outward from the longitudinal axis with each of the apertures opposing one of the grooves. The inner member further defines a center bore concentric with the longitudinal axis and extending through said apertures. The universal joint further comprises a plurality of drive balls having a spherical shape. One of the drive balls is supported by and rotatable within each of the apertures, and supported by one of the grooves in rolling engagement. A center pin is disposed within the center bore and engages the drive balls in rolling engagement. However, the universal joint disclosed in the '657 patent does not include a structure preventing the drive balls disposed between the apertures and the grooves from rattling therebetween as the inner member articulates relative to the outer member, thereby creating undesirable noise and vibration.

U.S. Pat. No. 6,685,571 (the '571 patent) also discloses such an inexpensive and easily produced universal joint. The universal joint comprises an outer member. The outer member defines an interior opening and a plurality of grooves disposed within the interior opening. The grooves extend along a longitudinal axis. An inner member is disposed within the interior opening and defines a plurality of pockets. The pockets are disposed radially about the longitudinal axis with each of the pockets opposing one of the grooves. The universal disclosed in the '571 patent joint further comprises a plurality of drive balls having a spherical shape. One of the drive balls is supported by and rotatable within one of the pockets, and supported by one of the grooves in rolling engagement. Each of the grooves includes a curved profile along the longitudinal axis to keep the drive balls in contact with the groove while the universal joint is articulated.

SUMMARY OF THE INVENTION AND ADVANTAGES

The subject invention provides a universal joint. The universal joint comprises an outer member defining an interior opening and a plurality of grooves disposed within the interior opening. The grooves extend along a longitudinal axis. Each of the grooves is parallel to all other of the grooves and includes a straight linear profile along the longitudinal axis. An inner member is disposed within the interior opening. The inner member defines a plurality of pockets disposed radially about the longitudinal axis. Each of the pockets opposes one of the grooves. The universal joint further comprises a plurality of drive balls. Each of the drive balls includes a spherical shape and is rotatable within one of the pockets. Each of the drive balls is also disposed within one of the grooves. Each of the drive balls includes a ball center and a central axis. The central axis extends through the ball center of each of the drive balls and intersects the longitudinal axis at a perpendicular angle. Each of the drive balls contacts one of the pockets along an annular contact interface. Each of the drive balls includes a first pocket radial line extending from the ball center to the annular contact interface and a second pocket radial line coplanar with the first pocket radial line and extending from the ball center to the annular contact interface on an opposing side of the central axis. The first pocket radial line and the second pocket radial line define a pocket contact angle measured between the first pocket radial line and the second pocket radial line. Each of the drive balls also contacts one of the grooves along a first linear interface and along a second linear interface. Each of the drive balls includes a first groove radial line extending between the ball center and the first linear interface and a second groove radial line extending between the ball center and the second liner interface on an opposing side of the central axis. The first groove radial line and the second groove radial line define a groove contact angle measured between the first groove radial line and the second groove radial line. The pocket contact angle is less than the groove contact angle to urge each of the plurality of drive balls upward against the plurality of grooves as the inner member articulates relative to the outer member.

Accordingly, the universal joint of the subject invention prevents undesirable noise by configuring the groove contact angle larger than the pocket contact angle to thereby urge the drive balls outward into the grooves. This permits the use of grooves having a straight linear profile, which are less costly to manufacture than the curved profile grooves utilized in the prior art to reduce the undesirable noise caused by the drive balls rattling between the pockets and the grooves as the inner member articulates relative to the outer member.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
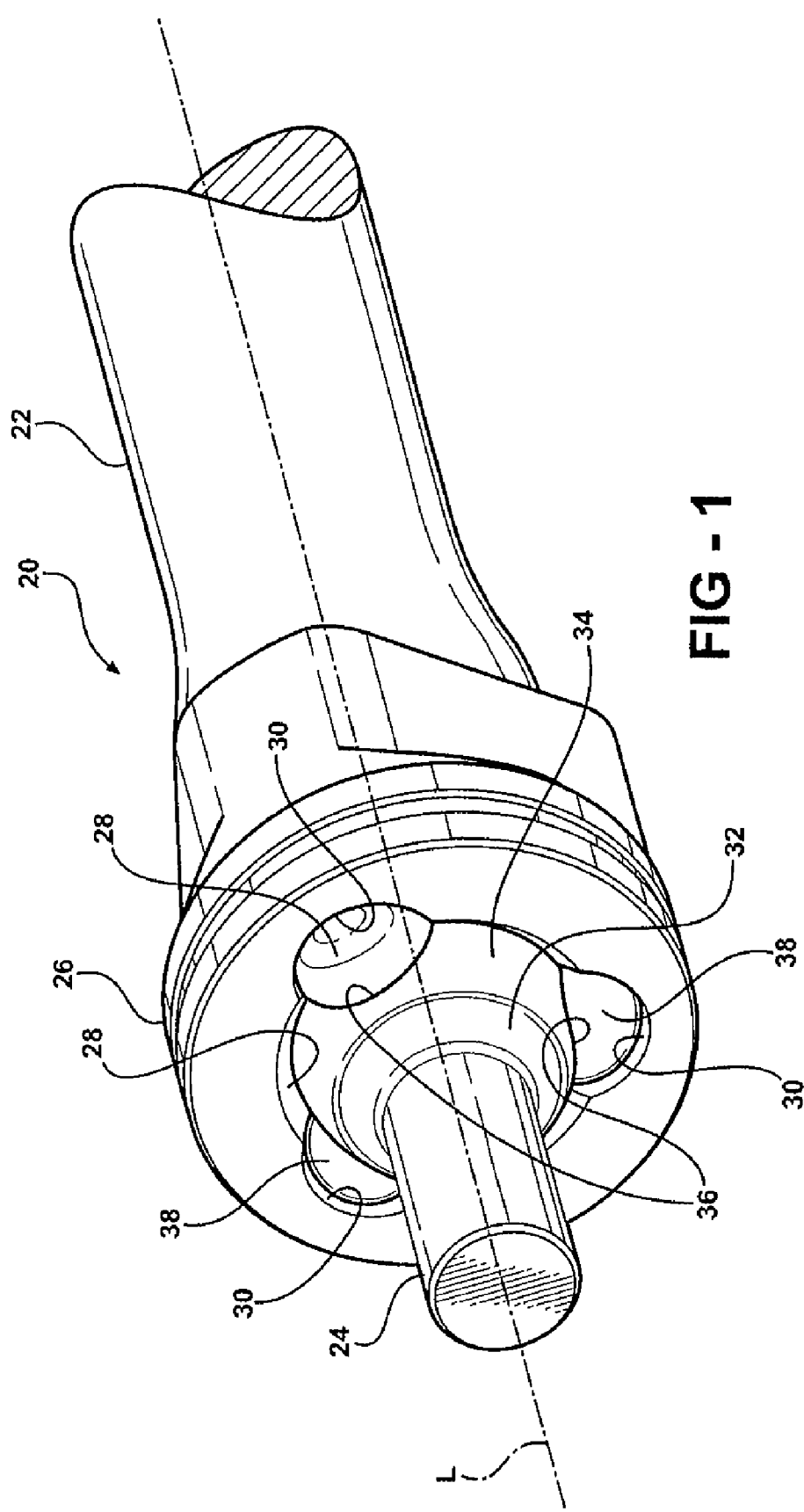
FIG. 1 is a perspective view of a universal joint.
Figure 2:
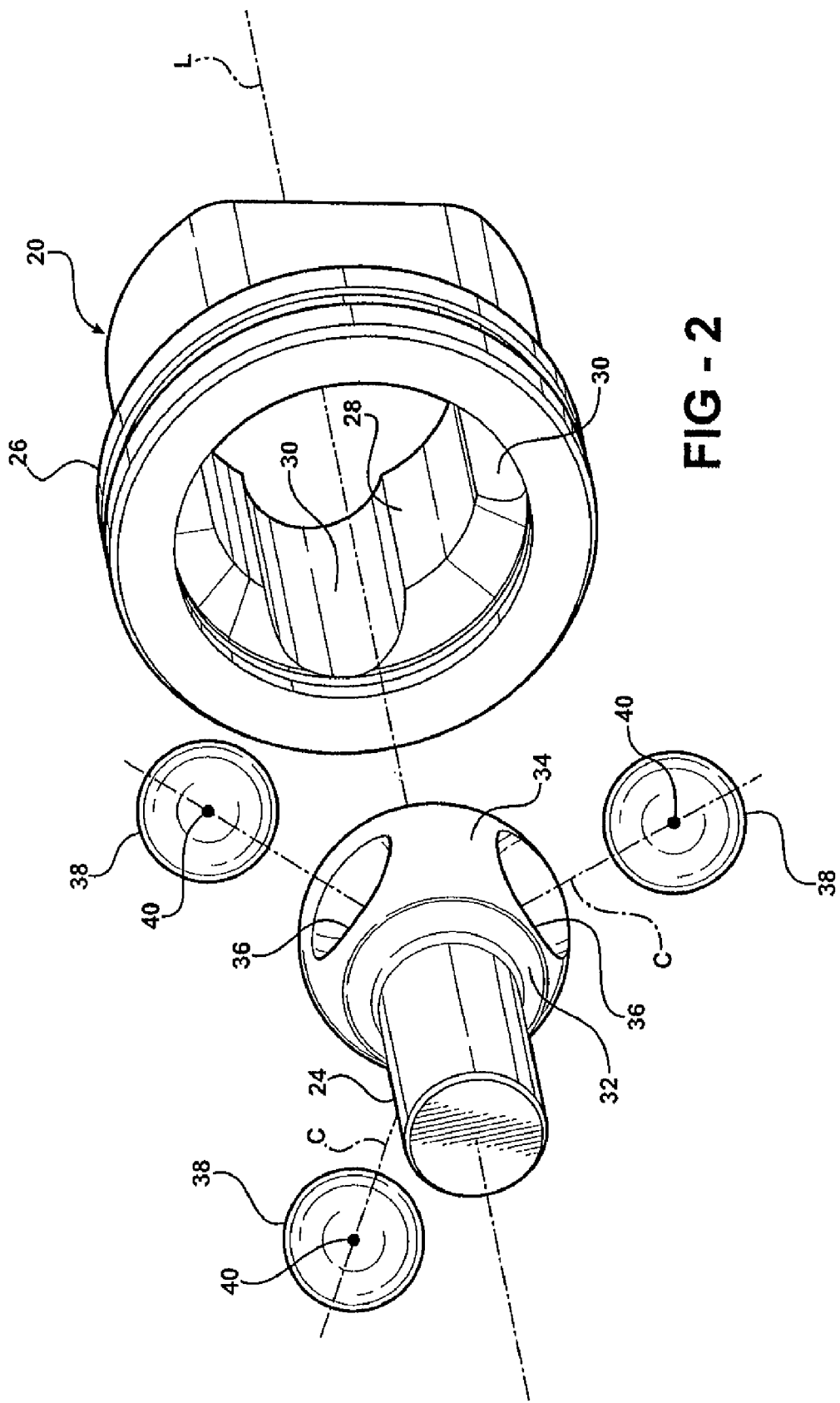
FIG. 2 is an exploded perspective view of the universal joint.
Figure 3:
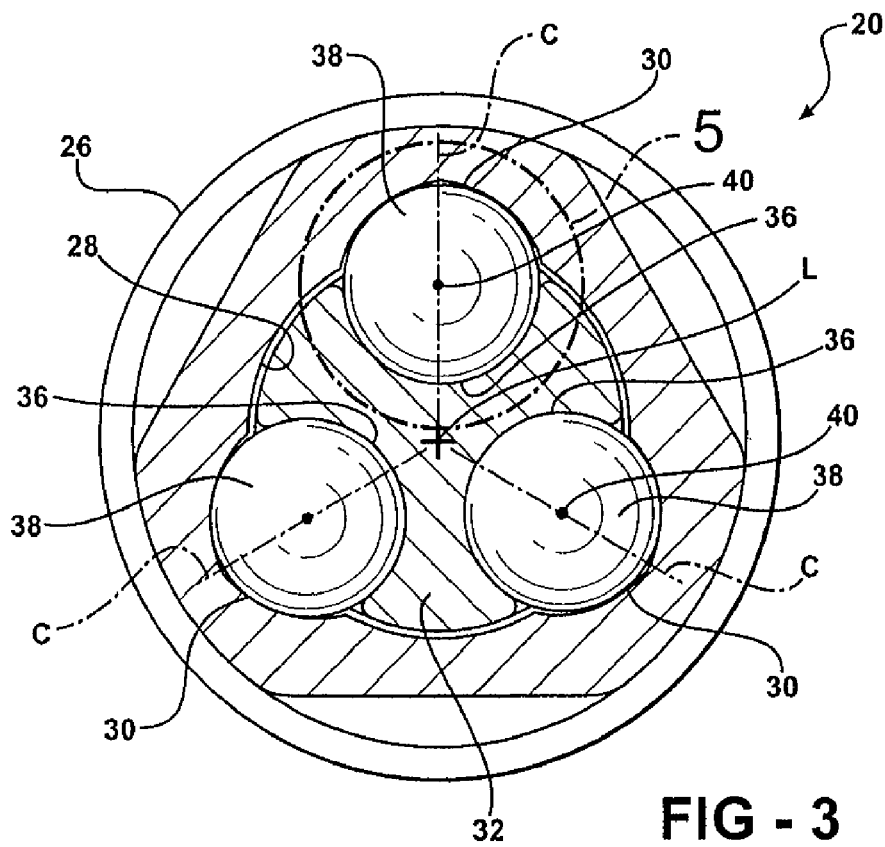
FIG. 3 is a transverse cross section of the universal joint.
Figure 4:
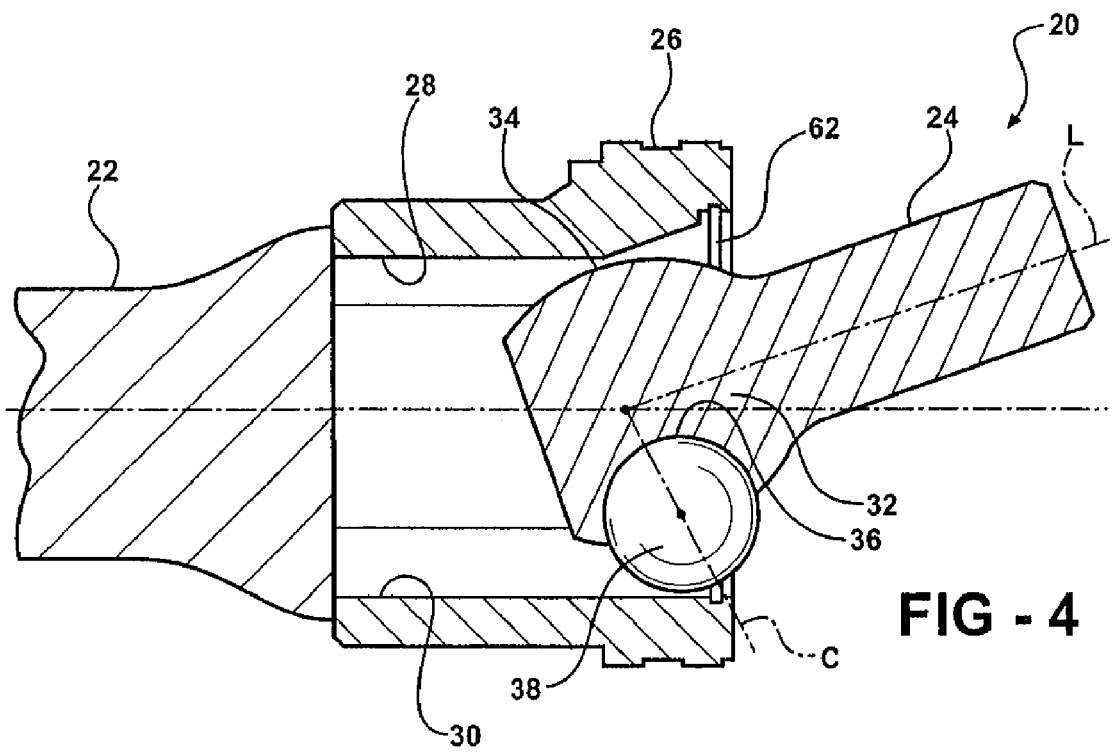
FIG. 4 is a longitudinal cross section of the universal joint.
Figure 5:
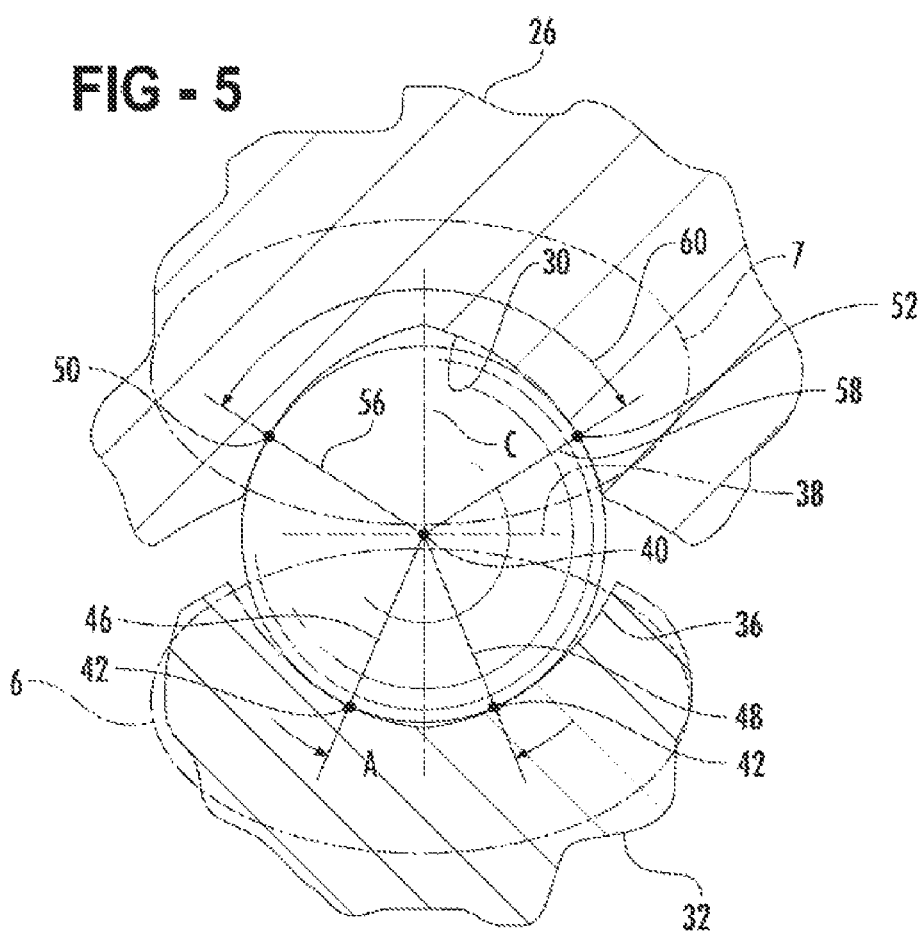
FIG. 5 is an enlarged fragmentary transverse cross section of the universal joint.
Figure 6:
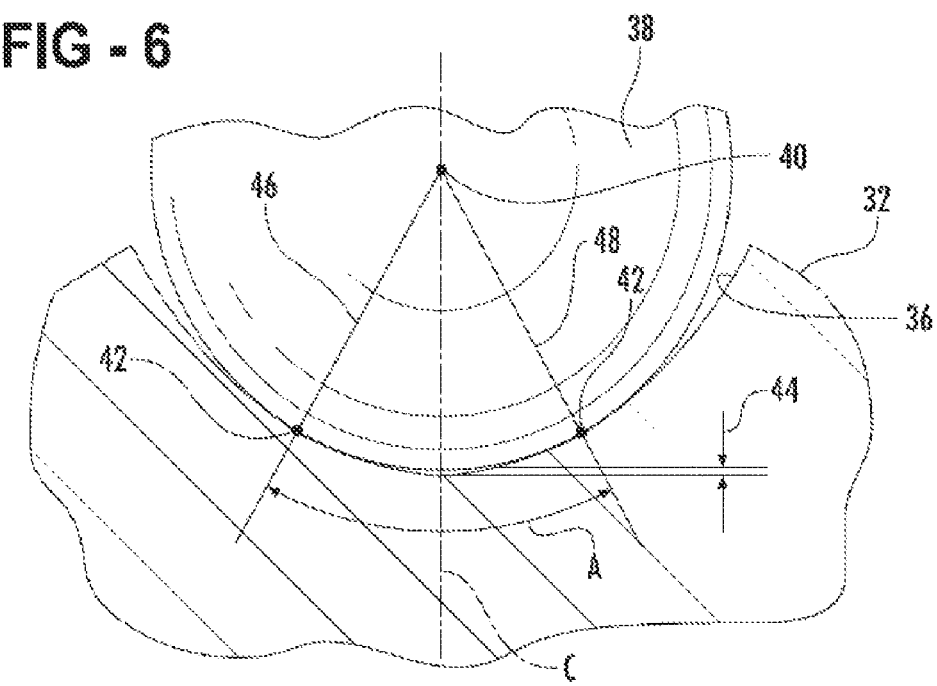
FIG. 6 is an enlarged fragmentary cross sectional view of a drive ball within a pocket of an inner member.
Figure 7:
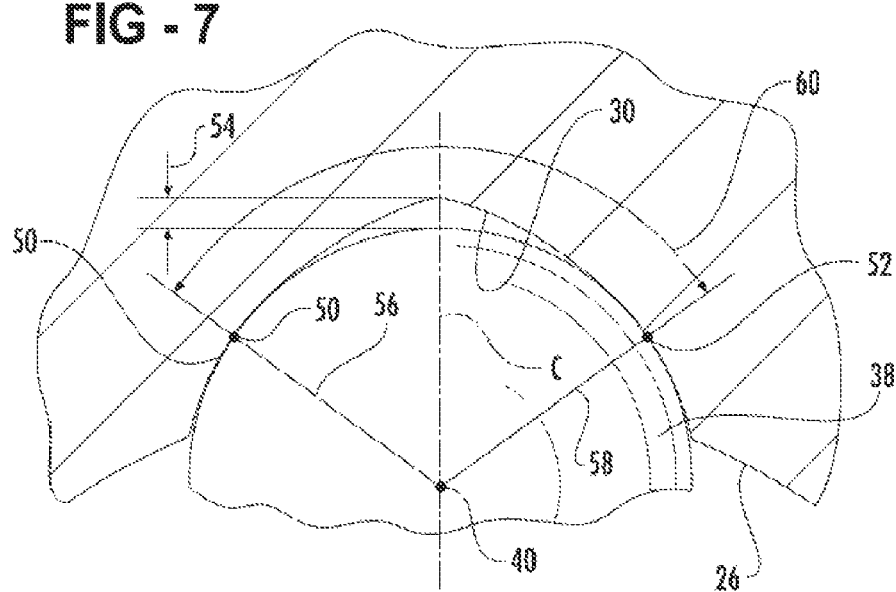
FIG. 7 is an enlarged fragmentary cross sectional view of a drive ball within a groove of an outer member.
Figure 8:
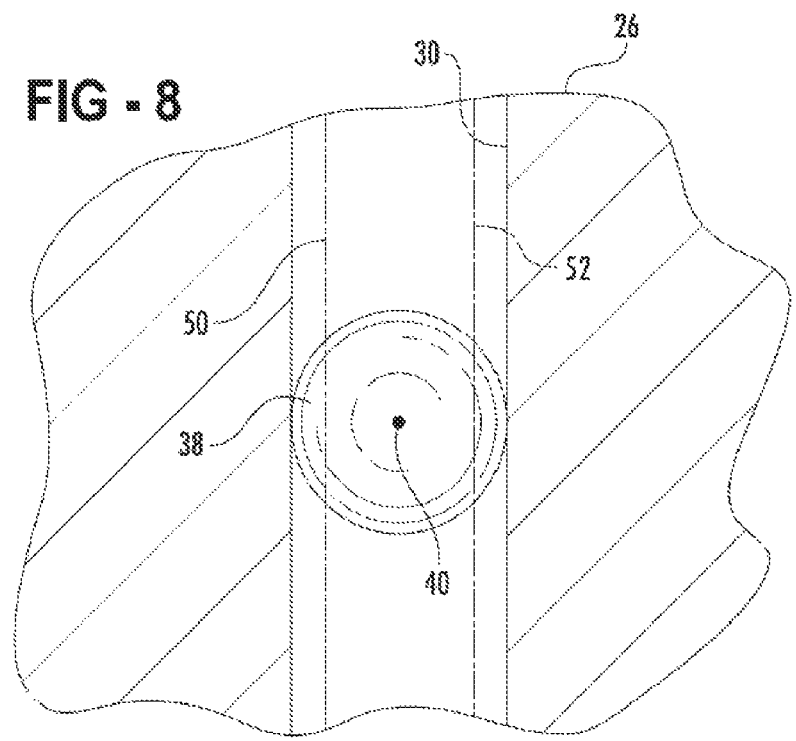
FIG. 8 is an enlarged fragmentary plan view of the drive ball within the groove of the outer member.

Referring to the Figures, wherein like numerals indicate corresponding parts throughout the several views, a universal joint is shown generally at 20. The universal joint 20 transmits torque, i.e., rotational movement, between a driving shaft 22 and a driven shaft 24 as the driving shaft 22 and the driven shaft 24 articulate relative to each other.

The universal joint 20 comprises an outer member 26. The outer member 26 is coupled to the driving shaft 22. The outer member 26 and the driving shaft 22 may be separate parts fixedly attached to each other for rotational movement together. Alternatively, the outer member 26 and the driving shaft 22 may be integrally formed as a single part.

The outer member 26 defines an interior opening 28 and a plurality of grooves 30 disposed within the interior opening 28. The grooves 30 extend along a longitudinal axis L. Each of the grooves 30 is parallel to all other of the grooves 30, and includes a straight linear profile along the longitudinal axis L. Preferably, the grooves 30 are spaced from each other radially about the longitudinal axis L. The grooves 30 include a cross section transverse to the longitudinal axis L. The cross section of the grooves 30 includes a non-circular shape. The non-circular cross section of the grooves 30 may include a gothic arch, an ellipse or a parabola. It should be appreciated that the non-circular cross section of the grooves 30 may also include a shape other than the gothic arch, the ellipse or the parabola.

An inner member 32 is disposed within the interior opening 28 of the outer member 26. The inner member 32 is coupled to the driven shaft 24. The inner member 32 and the driven shaft 24 may be separate parts fixedly attached to each other for rotational movement together. Alternatively, the inner member 32 and the driven shaft 24 may be integrally formed as a single part.

The inner member 32 includes a generally bulbous end 34, which is disposed within the interior opening 28 of the outer member 26. The inner member 32 defines a plurality of pockets 36 at the bulbous end 34. The pockets 36 are equally spaced from each other, disposed radially about and spaced from the longitudinal axis L. Each of the pockets 36 opposes one of the grooves 30, i.e., there are an equal number of opposing pockets 36 and grooves 30. Each of the pockets 36 includes a non-spherical shape. It should be appreciated that the non-spherical shape of the pockets 36 includes a cross section transverse to the longitudinal axis L that includes a non circular shape, with the cross sectional shape of the pockets 36 being different from the cross sectional shape of the grooves 30. The non-spherical shape of the pockets 36 may be defined by a gothic arch rotated about a central axis C, an ellipse rotated about the central axis C or by a parabola rotated about the central axis C. It should be appreciated that the non-spherical shape of the pockets 36 may also be defined by a shape other than the gothic arch, the ellipse or the parabola rotated about the central axis C.

The universal joint 20 further comprises a plurality of drive balls 38. Each of the drive balls 38 includes a spherical shape and is partially disposed and rotatable within one of the pockets 36. Each of the drive balls 38 is also partially disposed within one of the grooves 30 for rolling engagement therewith. Each of the drive balls 38 includes a ball center 40 and the central axis C. The central axis C extends through the ball center 40 of each of the drive balls 38 and intersects the longitudinal axis L at a perpendicular angle.

Each of the drive balls 38 contacts one of the pockets 36 along an annular contact interface 42, i.e., the non-spherical shape of the pockets 36 engage the spherical shape of the drive balls 38 along the annular contact interface 42. Because the spherical shape of the drive balls 38 is different from the non-spherical shape of the pockets 36, the drive balls 38 only contact the pockets 36 along the annular contact interface 42, i.e., an annular ring concentric with the central axis C of the drive balls 38. The location of the annular contact interface 42 depends on the non-spherical shape of the pockets 36. Accordingly, because the only contact between the drive balls 38 and the pockets 36 is along the annular contact interface 42, a first surface area of the pockets 36 below the annular contact surface nearer a base of the pocket 36 and a second surface area of the pockets 36 above the annular contact interface 42 nearer an outer perimeter of the pockets 36 do not contact the spherical shape of the drive balls 38. Accordingly, each of the pockets 36 and each of the drive balls 38 therein define a pocket separation distance 44 between the pockets 36 and the drive balls 38 along the central axis C near the base of the pocket 36.

Each of the drive balls 38 includes a first pocket radial line 46 and a second pocket radial line 48. The first pocket radial line 46 extends from the ball center 40 of the drive ball 38 to the annular contact interface 42. The second pocket radial line 48 is coplanar with the first pocket radial line 46 and extends from the ball center 40 of the drive ball 38 to the annular contact interface 42 on an opposing side of the central axis C relative to the first pocket radial line 46. The first pocket radial line 46 and the second pocket radial line 48 define a pocket contact angle A measured between the first pocket radial line 46 and the second pocket radial line 48.

Each of the drive balls 38 contacts one of the grooves 30 along a first linear interface 50 and a second linear interface 52, i.e., the non-circular cross section of the grooves 30 engages the spherical shape of the drive balls 38 along the first linear interface 50 and the second linear interface 52. Because the spherical shape of the drive balls 38 is different from the non-circular cross section of the grooves 30, the drive balls 38 contact the grooves 30 along two linear paths, i.e., the first liner interface and the second linear interface 52. This is a variation of a two-point contact extended along the straight linear profile of the grooves 30. The location of the first linear interface 50 and the second linear interface 52 depends upon the non-circular cross sectional shape of the grooves 30. Accordingly, because the only contact between the drive balls 38 and the grooves 30 is along the first linear interface 50 and the second linear interface 52, a first surface area of the grooves 30 above and between the first linear interface 50 and the second linear interface 52 nearer a base of the groove 30 and a second surface area of the groves below the first linear interface 50 and the second linear interface 52 nearer an outer edge of the grooves 30 do not contact the spherical shape of the drive balls 38. Accordingly, each of the grooves 30 and each of the drive balls 38 therein define a groove separation distance 54 between the grooves 30 and the drive balls 38 along the central axis C near the base of the grooves 30.

Each drive ball 38 includes a first groove radial line 56 and a second groove radial line 58. The first groove radial line 56 extends between the ball center 40 of the drive ball 38 and the first linear interface 50. The second groove radial line 58 extends between the ball center 40 of the drive ball 38 and the second liner interface on an opposing side of the central axis C relative to the first groove radial line 56. The first groove radial line 56 and the second groove radial line 58 define a groove contact angle 60 measured between the first groove radial line 56 and the second groove radial line 58.

The groove contact angle 60 is greater in magnitude, i.e., larger in value, than the pocket contact angle A, or stated in the reverse, the pocket contact angle A is lesser in magnitude, i.e., smaller in value, than the groove contact angle 60. The smaller pocket contact angle A urges each of the drive balls 38 upward against the grooves 30 as the inner member 32 articulates relative to the outer member 26. The pocket contact angle A produces a radial load along the central axis C of the drive balls 38 outward away from the longitudinal axis L. The groove contact angle 60 produces a radial load along the central axis C of the drive balls 38 inward toward the longitudinal axis L. The radial load produced from the pocket contact angle A is greater than the radial load produced by the groove contact angle 60 because the pocket contact angle A is smaller than the groove contact angle 60. Thus, a net radial load is created urging the drive balls 38 outward away from the longitudinal axis L and into the grooves 30. It should be appreciated that the larger groove contact angle 60 permits more of the load to be directed in a direction transverse to the longitudinal axis L, and therefore the smaller pocket contact angle A produces a higher radial load along the central axis C.

A retaining mechanism 62 retains the bulbous end 34 of the inner member 32 and the drive balls 38 within the interior opening 28 of the outer member 26. The retaining mechanism 62 may include recess defined by the outer member 26 within the interior opening 28, with a spring C-clip disposed within the recess. However, it should be appreciated that the retaining mechanism 62 may include some other similar device capable of preventing the removal of the inner member 32 from the interior opening 28 of the outer member 26 without significantly interfering with articulation of the inner member 32 relative to the outer member 26.

Preferably, the plurality of pockets 36 is equal to three pockets 36, the plurality of grooves 30 is equal to three grooves 30 and the plurality of drive balls 38 is equal to three drive balls 38. However, it should be appreciated that the number of plurality of pockets 36 may be equal to two pockets 36 or greater than three pockets 36, the plurality of grooves 30 may be equal to two grooves 30 or greater than three grooves 30 and the plurality of drive balls 38 may be equal to two drive balls 38 or greater than three drive balls 38.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A universal joint comprising:
   an outer member defining an interior opening and a plurality of grooves disposed within said interior opening and extending along a longitudinal axis with each of said plurality of grooves being parallel to all other of said plurality of grooves and including a straight linear profile along said longitudinal axis;
   an inner member disposed within said interior opening and defining a plurality of pockets disposed radially about said longitudinal axis with each of said plurality of pockets opposing one of said plurality of grooves;
   a plurality of drive balls each having a spherical shape and each of said plurality of drive balls rotatable within one of said plurality of pockets and disposed within one of said plurality of grooves with each of said plurality of drive balls including a ball center and a central axis extending through said ball center of each of said plurality of drive balls and intersecting said longitudinal axis at a perpendicular angle;
   each of said plurality of drive balls contacting one of said plurality of pockets along an annular contact interface and including a first pocket radial line extending from said ball center to said annular contact interface and a second pocket radial line coplanar with said first pocket radial line and extending from said ball center to said annular contact interface on an opposing side of said central axis to define a pocket contact angle measured between said first pocket radial line and said second pocket radial line and each of said plurality of drive balls contacting one of said plurality of grooves along a first linear interface and a second linear interface and including a first groove radial line extending between said ball center and said first linear interface and a second groove radial line extending between said ball center and said second liner interface on an opposing side of said central axis to define a groove contact angle measured between said first groove radial line and said second groove radial line with said pocket contact angle being less than said groove contact angle to urge each of said plurality of drive balls upward against said plurality of grooves as said inner member articulates relative to said outer member.

2. A joint as set forth in claim 1 wherein each of said plurality of pockets includes a non-spherical shape engaging said spherical shape of said plurality of drive balls along said annular contact interface between each of said plurality of pockets and each of said plurality of drive balls therein.

3. A joint as set forth in claim 2 wherein said non-spherical shape of said plurality of pockets is defined by a parabola rotated about said central axis.

4. A joint as set forth in claim 2 wherein each of said pockets and each of said drive balls therein define a pocket separation distance between said pockets and said drive balls along said central axis.

5. A joint as set forth in claim 1 wherein said plurality of grooves include a cross section transverse to said longitudinal axis having a non-circular shape engaging said spherical shape of said plurality of drive balls along said first linear interface and said second linear interface between each of said plurality of grooves and each of said plurality of drive balls engaged therewith.

6. A joint as set forth in claim 5 wherein said non-circular cross section of said plurality of grooves includes a gothic arch.

7. A joint as set forth in claim 5 wherein each of said plurality of pockets includes a non-spherical shape including a cross section transverse to said longitudinal axis having a non-circular cross section with said cross section of said plurality of pockets being different from said cross section of said plurality of grooves.

8. A joint as set forth in claim 5 wherein each of said grooves and each of said drive balls therein define a groove separation distance between said grooves and said drive balls along said central axis.

9. A joint as set forth in claim 1 wherein said plurality of pockets is equal to three pockets, said plurality of grooves is equal to three grooves and said plurality of drive balls is equal to three drive balls.

10. A joint as set forth in claim 1 further comprising a retaining mechanism retaining said inner member and said plurality of drive balls within said interior opening of said outer member.

* * * * *